United States Patent
Maemura et al.

(10) Patent No.: US 7,322,342 B2
(45) Date of Patent: Jan. 29, 2008

(54) CONTROL DEVICE OF IN-CYLINDER DIRECT-INJECTION INTERNAL COMBUSTION ENGINE

(75) Inventors: Jun Maemura, Aichi-ken (JP);
Masanao Idogawa, Toyota (JP);
Masahiko Teraoka, Toyota (JP);
Osamu Hosokawa, Toyota (JP);
Takeyasu Muraishi, Hamamatsu (JP)

(73) Assignees: Toyota Jidosha Kabushiki Kaisha, Toyota-shi (JP); Yamaha Hatsudoki Kabushiki Kaisha, Iwata-shi (JP)

( * ) Notice: Subject to any disclaimer, the term of this patent is extended or adjusted under 35 U.S.C. 154(b) by 0 days.

(21) Appl. No.: 11/483,605

(22) Filed: Jul. 11, 2006

(65) Prior Publication Data

US 2007/0012295 A1 Jan. 18, 2007

(30) Foreign Application Priority Data

Jul. 14, 2005 (JP) ............................. 2005-205962

(51) Int. Cl.
*F02D 41/06* (2006.01)
*F02B 3/02* (2006.01)
*F02P 5/15* (2006.01)

(52) U.S. Cl. ............... 123/491; 123/179.5; 123/179.16; 123/305

(58) Field of Classification Search ............. 123/179.5, 123/179.16, 294, 305, 481, 491
See application file for complete search history.

(56) References Cited

U.S. PATENT DOCUMENTS

| 2007/0023007 A1* | 2/2007 | Maemura et al. ........... 123/305 |
| 2007/0023012 A1* | 2/2007 | Maemura et al. ........... 123/305 |

FOREIGN PATENT DOCUMENTS

| JP | 10-9004 | 1/1998 |
| JP | 11-270387 | 10/1999 |
| JP | 2000-97071 | 4/2000 |
| JP | 2002-138883 | 5/2002 |
| JP | 2005-155434 | * 6/2005 |

* cited by examiner

*Primary Examiner*—T. M Argenbright
(74) *Attorney, Agent, or Firm*—Oblon, Spivak, McClelland, Maier & Neustadt, P.C.

(57) ABSTRACT

A requested injection amount of fuel necessary during ignition cut-off at the time of start at an extremely low temperature is calculated (step ST2), injection start timing and injection end timing between which wetting of a spark plug by fuel is less likely are set (step ST3), and the number of times of ignition cut-off is calculated based on the injection start timing and the injection end timing and the requested injection amount (step ST4). The injection start timing and the injection end timing are thus restricted to timings between which plug wetting is less likely, and the number of times of ignition cut-off is calculated based on the injection start timing and the injection end timing and the requested injection amount, so that wetting of the spark plug by fuel at the extremely low temperature can be avoided even in an in-cylinder direct-injection engine.

12 Claims, 5 Drawing Sheets

CONTROL DEVICE OF IN-CYLINDER DIRECT-INJECTION INTERNAL COMBUSTION ENGINE

This nonprovisional application is based on Japanese Patent Application No. 2005-205962 filed with the Japan Patent Office on Jul. 14, 2005, the entire contents of which are hereby incorporated by reference.

FIELD OF THE INVENTION

The present invention relates to a control device of an in-cylinder direct-injection internal combustion engine mounted on a vehicle or the like, and more specifically to a control device of an in-cylinder direct-injection internal combustion engine controlling ignition cut-off for suspending ignition of an air-fuel mixture in a combustion chamber when the internal combustion engine is started at an extremely low temperature.

DESCRIPTION OF THE BACKGROUND ART

An in-cylinder direct-injection internal combustion engine (hereinafter, also referred to as an in-cylinder direct-injection engine) is an engine of such a type that a fuel injection valve (injector) is arranged in each cylinder, fuel such as gasoline is directly injected into a combustion chamber from the fuel injection valve so that the fuel is mixed with intake air introduced through an intake port into the combustion chamber to form an air-fuel mixture, and the air-fuel mixture is ignited by a spark plug. Demand for the in-cylinder direct-injection engine has rapidly increased, because of its excellence in fuel efficiency, low emission, high power, and the like.

On the other hand, in the in-cylinder direct-injection engine, a time period from fuel injection until the fuel reaches an ignition position is shorter than in a port injection engine injecting fuel into the intake port. Accordingly, atomization of the fuel injected into the cylinder is insufficient at the time of start at an extremely low temperature (for example, −25° C. or lower), which leads to unsatisfactory ignition and poor starting capability.

Methods for solving such problems at the time of start at the extremely low temperature include a method of cutting off ignition, that is, prohibiting ignition for at least one cycle during cranking at the time of start at the extremely low temperature (for example, see Japanese Patent Laying-Open No. 2000-097071) and a method of performing solely fuel injection with ignition by the spark plug being cut off for a prescribed period (ignition cut-off period) at the initial stage of start, and starting ignition along with fuel injection only after the ignition cut-off period has passed (for example, see Japanese Patent Laying-Open No. 11-270387). By carrying out such ignition cut-off, fuel that can contribute to combustion (ignition) can be accumulated in the cylinder.

In the in-cylinder direct-injection engine, however, simply supplying the fuel with ignition being cut off at the time of start at the extremely low temperature leads to occurrence of wetting of the spark plug by fuel (hereinafter, also referred to as plug wetting) and poorer starting capability. Particularly, as an in-cylinder direct-injection engine in which combustion is unsatisfactory due to a shape of the combustion chamber or the like or an in-cylinder direct-injection engine in which friction is large is an engine low in generated torque and hard to start, such an engine tends to experience start failure at the extremely low temperature.

The patent documents mentioned above are silent about such problems of plug wetting at the time of start at the extremely low temperature, and the methods described in these patent documents, that is, the method of prohibiting ignition for at least one cycle during cranking and the method of performing solely fuel injection with ignition being cut off for a prescribed period at the initial stage of start cannot solve these problems.

SUMMARY OF THE INVENTION

The present invention was made in consideration of the above-described situations. An object of the present invention is to provide a control device of an in-cylinder direct-injection internal combustion engine capable of avoiding wetting of a spark plug by fuel at an extremely low temperature in start control for controlling ignition cut-off in the in-cylinder direct-injection internal combustion engine when the engine is started at the extremely low temperature as well as improving starting capability at the extremely low temperature.

The present invention is directed to a control device of an in-cylinder direct-injection internal combustion engine applied to an in-cylinder direct-injection internal combustion engine, in which fuel is directly injected into a combustion chamber of each cylinder from a fuel injection valve and an air-fuel mixture formed by fuel injection is ignited by a spark plug and burnt, and controlling ignition cut-off for suspending ignition by the spark plug when the internal combustion engine is started at an extremely low temperature. The control device of an in-cylinder direct-injection internal combustion engine includes: an injection amount calculating unit calculating a requested injection amount of fuel necessary during ignition cut-off based on a temperature of engine coolant when the internal combustion engine is started at the extremely low temperature; an injection timing setting unit setting injection start timing and injection end timing between which wetting of the spark plug by fuel is less likely; an ignition cut-off times calculating unit calculating the number of times of ignition cut-off based on the set injection start timing and injection end timing and a calculated value of the requested injection amount; and a start control unit carrying out ignition cut-off at the time of start at the extremely low temperature based on a calculated value of the number of times of ignition cut-off.

According to the present invention, a requested injection amount of fuel necessary during ignition cut-off at the time of start at the extremely low temperature is calculated and the fuel injection start timing and the fuel injection end timing are restricted to timings between which plug wetting is less likely. In addition, the number of times of ignition cut-off is calculated based on the injection start timing and the injection end timing and the requested injection amount. Therefore, even in an in-cylinder direct-injection engine in which combustion is unsatisfactory due to a shape of the combustion chamber or the like or an in-cylinder direct-injection engine in which friction is large, wetting of the spark plug by fuel can be avoided by restricting the injection start timing and the injection end timing for start at the extremely low temperature in accordance with characteristics of each engine. Successful first cycle at the time of start at the extremely low temperature can thus be ensured and excellent starting capability can be achieved.

The present invention may be configured such that a first-injection cylinder in which fuel was injected first during ignition cut-off is determined and ignition is started when next fuel injection is performed in the first-injection cylinder after the fuel in the requested injection amount for each cylinder is supplied to the first-injection cylinder. By adopting such a configuration, fuel supply in an amount greater than the requested injection amount to the first-injection cylinder is avoided. In addition, as fuel supply in an amount greater than the requested injection amount also to a cylinder in which fuel is injected subsequent to the first-injection cylinder is avoided by starting ignition from the first-injection cylinder, smoldering of the spark plug after ignition can be avoided.

The present invention may be configured such that a first-injection cylinder in which fuel was injected first during ignition cut-off is determined and ignition is started when next fuel injection is performed after the end of fuel injection as many times as the calculated value of the number of times of ignition cut-off for all cylinders counting from fuel injection in the first-injection cylinder.

Here, the injection start timing and the injection end timing between which wetting of the spark plug by fuel is less likely will be described.

Initially, in an in-cylinder direct-injection engine having excellent generated torque at the time of start, even if a period during which fuel injection is allowed is maximized (for example, injection start timing is set to BTDC 390° and injection end timing is set to BTDC 60°) and the fuel is injected on the side of the top dead center (TDC), the engine can successfully be started, because the torque is generated and the engine speed increases when combustion proceeds to some extent. In contrast, the in-cylinder direct-injection engine in which combustion is unsatisfactory due to a shape of the combustion chamber or the like or the in-cylinder direct-injection engine in which friction is large is low in the generated torque and hard to start. Accordingly, if the fuel is injected on the top dead center side, liquid fuel that impinges on a top surface of the piston or the like and is rebound directly hits the spark plug, which causes plug wetting. Then, satisfactory first cycle is not achieved and start failure may occur. Considering such aspects, according to the present invention, both the injection start timing and the injection end timing are restricted to timings except for timing around the top dead center (see FIG. 5), thereby avoiding plug wetting. If the injection start timing and the injection end timing are excessively restricted, ignition is cut off too many times. Therefore, the injection start timing and the injection end timing should be set, taking into account balance between plug wetting avoidance and the number of times of ignition cut-off described above.

According to the present invention, a requested injection amount of fuel necessary during ignition cut-off at the time of start at the extremely low temperature is calculated and the fuel injection start timing and the fuel injection end timing are restricted to timings between which plug wetting is less likely. In addition, the number of times of ignition cut-off is calculated based on the injection start timing and the injection end timing and the requested injection amount. Therefore, wetting of the spark plug by fuel at the extremely low temperature can be avoided and starting capability at the extremely low temperature can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

Initially, an engine (internal combustion engine) to which the present invention is applied will be described.

Engine

Figure 1:
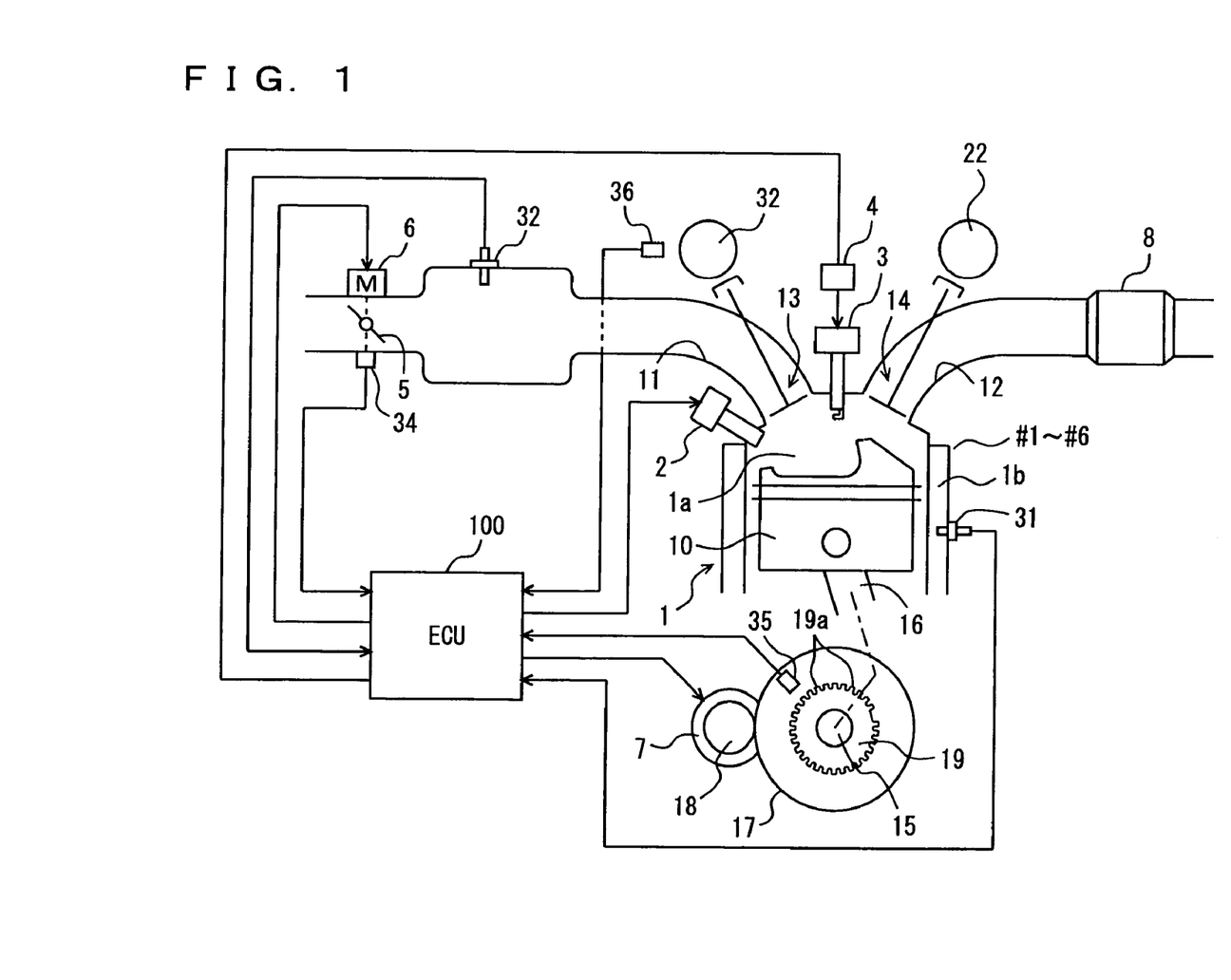
FIG. 1 is a schematic diagram showing a configuration of an exemplary in-cylinder direct-injection engine to which the present invention is applied.

FIG. 1 schematically shows a configuration of an engine to which the present invention is applied. It is noted that FIG. 1 shows solely the configuration of one cylinder of the engine.

An engine 1 is implemented, for example, by an in-cylinder direct-injection six-cylinder gasoline engine having six cylinders (cylinder #1 to cylinder #6), and includes a piston 10 forming a combustion chamber 1a and a crankshaft 15 serving as an output shaft. Piston 10 is connected to crankshaft 15 through a connecting rod 16, so that reciprocating motion of piston 10 is converted to rotation of crankshaft 15 by connecting rod 16.

A ring gear 17 is provided in crankshaft 15. Ring gear 17 is engaged with a pinion gear 18 of a starter motor 7 which is started when engine 1 is started, and cranking of engine 1 is carried out by using rotation of ring gear 17 along with actuation of starter motor 7.

A signal rotor 19 having a plurality of protrusions (teeth) 19a . . . 19a on its outer circumferential surface is attached to crankshaft 15. A crank position sensor 35 is arranged in the vicinity of signal rotor 19 on the lateral side. Crank position sensor 35 is implemented, for example, by an electromagnetic pickup, and generates a pulse-like signal (output pulse) corresponding to protrusions 19a of signal rotor 19 when crankshaft 15 rotates.

A spark plug 3 is arranged in combustion chamber 1a of engine 1 for each cylinder #1 to #6. An igniter 4 adjusts ignition timing of spark plug 3. A coolant temperature sensor 31 for detecting a temperature of a coolant (coolant temperature) that circulates through a water jacket 1b is arranged in engine 1.

An intake manifold 11 and an exhaust manifold 12 are connected to combustion chamber 1a of engine 1. An intake valve 13 is provided between intake manifold 11 and combustion chamber 1a. By opening/closing intake valve 13, connection or disconnection between intake manifold 11 and combustion chamber 1a is achieved. In addition, an exhaust valve 14 is provided between exhaust manifold 12 and combustion chamber 1a. By opening/closing exhaust valve 14, connection or disconnection between exhaust manifold 12 and combustion chamber 1a is achieved. Opening/closing of intake valve 13 and exhaust valve 14 is achieved by rotation of an intake camshaft 21 and an exhaust camshaft 22 to which rotation of crankshaft 15 is transmitted.

A cam position sensor 36 for determining a cylinder is arranged in the vicinity of intake camshaft 21. Cam position sensor 36 is implemented, for example, by an electromagnetic pickup, and arranged to oppose to one protrusion (tooth) on an outer circumferential surface of a rotor provided in a manner integrated with intake camshaft 21. Cam position sensor 36 generates a pulse-like signal when intake camshaft 21 rotates. As intake camshaft 21 rotates at a speed half that of crankshaft 15, cam position sensor 36 generates one pulse-like signal (output pulse) for each rotation by 720° of crankshaft 15.

A throttle valve 5 for regulating an intake air amount in engine 1 is arranged upstream of intake manifold 11. Throttle valve 5 is driven by a throttle motor 6. A position of throttle valve 5 is detected by a throttle position sensor 34. In addition, a vacuum sensor 32 for detecting a pressure (intake pressure) in intake manifold 11 is arranged in intake manifold 11 on the downstream side of throttle valve 5. A three-way catalyst 8 is arranged in exhaust manifold 12 of engine 1.

Engine 1 is provided with an injector (fuel injection valve) 2 directly injecting fuel into combustion chamber 1a for each cylinder #1 to #6. A high-pressure fuel is supplied to injector 2 in each cylinder, and the fuel is directly injected from each injector 2 into combustion chamber 1a, so that the air-fuel mixture resulted from mixing of air and fuel is formed in combustion chamber 1a, ignited by spark plug 3, and burnt in combustion chamber 1a. As a result of combustion of the air-fuel mixture in combustion chamber 1a, piston 10 carries out reciprocating motion and crankshaft 15 rotates.

An operation state of engine 1 above is controlled by an ECU (electronic control unit) 100.

ECU

Figure 2:
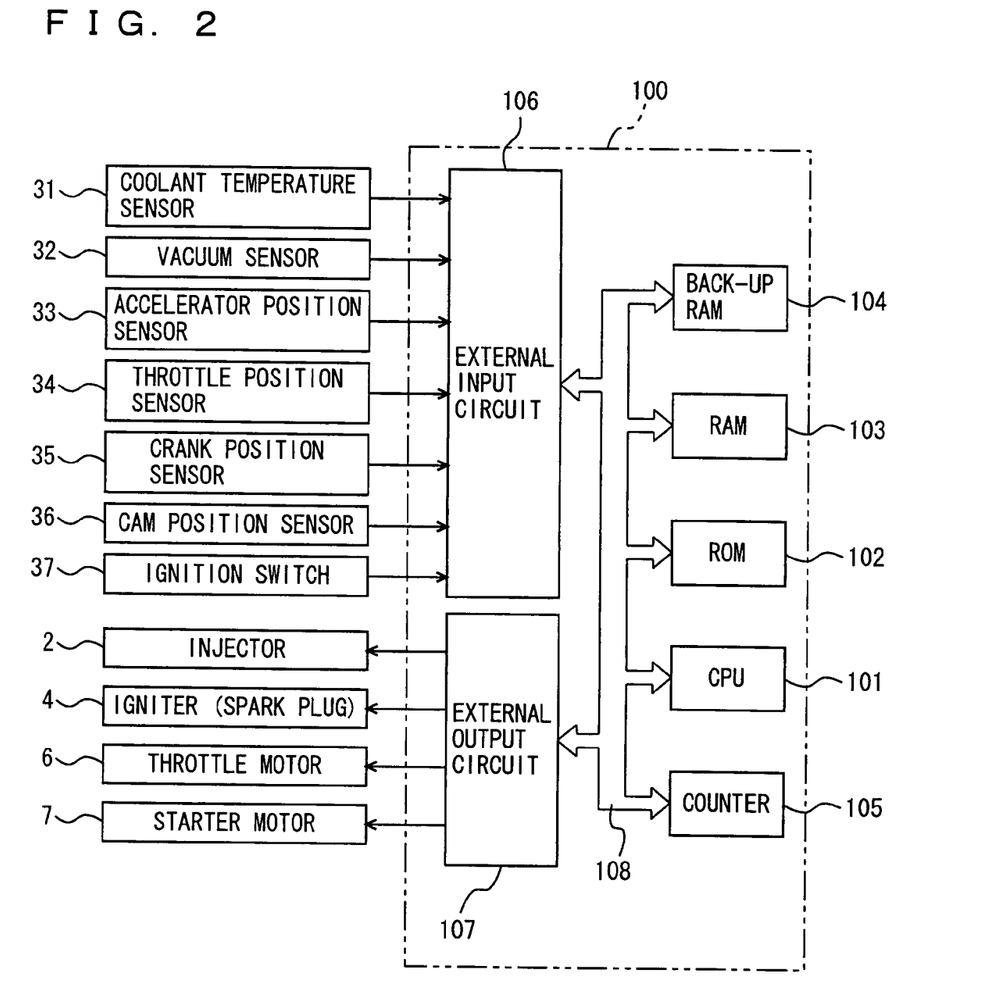
FIG. 2 is a block diagram showing a configuration of a control system such as an ECU.

As shown in FIG. 2, ECU 100 includes a CPU 101, an ROM 102, an RAM 103, a back-up RAM 104, and a counter 105 counting the number of times of fuel injection while ignition is cut off, which will be described later.

ROM 102 stores a variety of control programs, maps that are referred to in execution of the variety of control programs, and the like. CPU 101 performs operational processing based on the variety of control programs and maps stored in ROM 102. RAM 103 serves as a memory that temporarily stores a result of operation performed in CPU 101, data input from each sensor, and the like. Back-up RAM 104 serves as a non-volatile memory that stores data or the like to be stored when engine 1 is stopped. ROM 102, CPU 101, RAM 103, back-up RAM 104, and counter 105 are connected to each other through a bus 108, and connected to an external input circuit 106 and an external output circuit 107.

Coolant temperature sensor 31, vacuum sensor 32, an accelerator position sensor 33, throttle position sensor 34, crank position sensor 35, cam position sensor 36, an ignition switch 37, and the like are connected to external input circuit 106. Meanwhile, injector 2, igniter 4 of ignition plug 3, throttle motor 6 of throttle valve 5, starter motor 7, and the like are connected to external output circuit 107.

ECU 100 carries out various types of control of engine 1 such as opening/closing control of injector 2 (control of the fuel injection start timing and the fuel injection end timing), based on outputs from various sensors such as coolant temperature sensor 31, vacuum sensor 32, accelerator position sensor 33, throttle position sensor 34, crank position sensor 35, cam position sensor 36, and the like. In addition, ECU 100 controls start at an extremely low temperature described below.

Control of Start at Extremely Low Temperature

Figure 3:
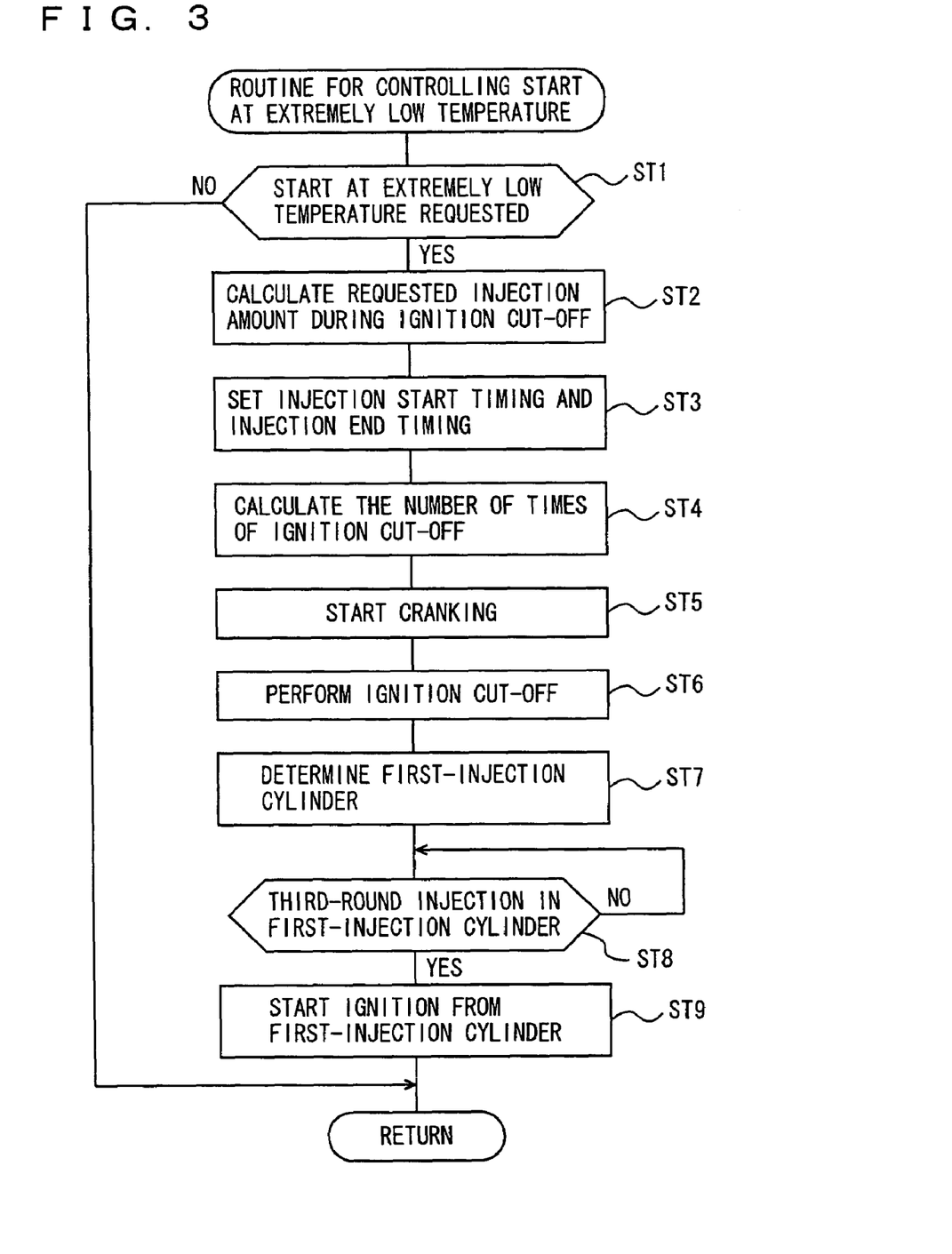
FIG. 3 is a flowchart showing one example of processing for controlling start at an extremely low temperature executed by the ECU.

An example of processing for controlling start at the extremely low temperature executed by ECU 100 will be described with reference to the flowchart shown in FIG. 3. It is noted that the present embodiment is directed, for example, to an engine low in generated torque at the time of start, such as an in-cylinder direct-injection engine in which combustion is unsatisfactory due to a shape of the combustion chamber or the like or an in-cylinder direct-injection engine in which friction is large.

Initially, in step ST1, when a request to start engine 1 (ignition switch ON) is made, a coolant temperature is read from the output from coolant temperature sensor 31. If the coolant temperature is not higher than a prescribed value (for example, −25° C.), it is determined that a "request for start at the extremely low temperature has been made" and the routine proceeds to step ST2. If the result of determination in step ST1 indicates NO, the routine ends.

In step ST2, an amount of fuel injection necessary during ignition cut-off (hereinafter, referred to as requested injection amount) is calculated from the map based on the coolant temperature. The map for calculating the requested injection amount is a map taking into account an amount of fuel used for wetting the piston at the extremely low temperature. This map is created using the coolant temperature of engine 1 as a parameter, and stored in ROM 102 of ECU 100.

Then, in step ST3, the injection start timing and the injection end timing between which wetting of spark plug 3 by fuel is less likely are set. The injection timing that is set will be described below.

Figure 5:
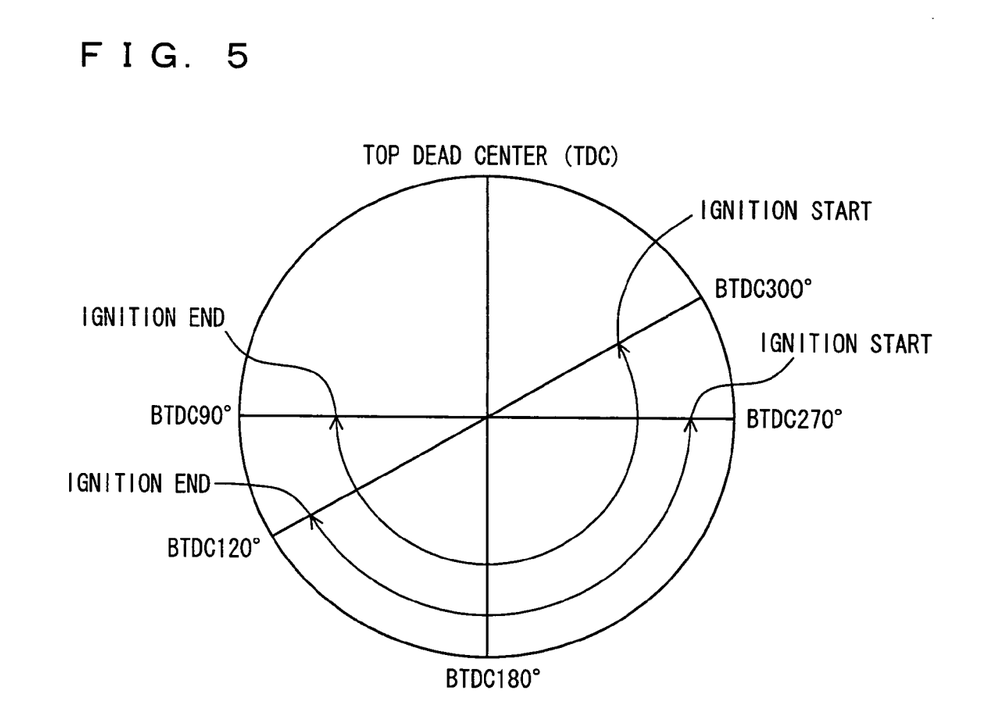
FIG. 5 illustrates injection start timing and injection end timing between which plug wetting is less likely.

As described above, the in-cylinder direct-injection engine in which combustion is unsatisfactory due to a shape of the combustion chamber or the like or the in-cylinder direct-injection engine in which friction is large is an engine low in the generated torque and hard to start. Accordingly, if the fuel is injected on the top dead center side at the time of start at the extremely low temperature, liquid fuel that impinges on a top surface of the piston or the like and is rebound directly hits spark plug 3, which causes plug wetting. In order to avoid such plug wetting, in this embodiment, both the injection start timing and the injection end timing are set to timings except for timing around the top dead center. For example, the injection start timing is set to BTDC 300° and the injection end timing is set to BTDC 90° (or the injection start timing is set to BTDC 270° and the injection end timing is set to BTDC 120°) as shown in FIG. 5. The injection start timing and the injection end timing are set in such a manner that the timings are stored in advance in ROM 102 or the like of ECU 100 and they are read and set at the time of start at the extremely low temperature.

In step ST4, the number of times of ignition cut-off is calculated based on the calculated value of the requested injection amount calculated in step ST2, the injection start timing and the injection end timing set in step ST3, and the cranking speed set in advance.

Here, in the case of a six-cylinder engine, the number of times of ignition cut-off is set, for example, to 6 (once for one cylinder), 12 (twice for one cylinder), 18 (three times for one cylinder), and so on. In the present embodiment, an example in which the calculated value of the times of ignition cut-off is set to 12 (fuel injection twice (injection in two rounds)) will be described. If the number of times of ignition cut-off is equal to or larger than that comparable to two rounds (injection in two or more rounds), the exhaust stroke comes during ignition cut-off, however, fuel supply as a result of ignition cut-off is used for compensation for piston wetting. Therefore, an amount of fuel exhausted in the exhaust stroke can be small, and error with respect to the requested injection amount is not great.

After the processing for calculating the number of times of ignition cut-off above is completed, cranking is started (step ST5), and solely fuel injection is performed while ignition is being cut off (step ST6). Here, fuel injection with ignition being cut off is performed, starting at the injection start timing and ending at the injection end timing set in step ST3 above. In addition, the number of times of ignition cut-off is set to the value calculated in step ST4 (12 for all cylinders, and 2 for each cylinder).

Thereafter, in step ST7, a cylinder in which the fuel was injected first during ignition cut-off (hereinafter, referred to as first-injection cylinder) is determined based on outputs from crank position sensor 35 and cam position sensor 36. For example, if cylinder #3 is the first-injection cylinder, first-round fuel injection during ignition cut-off is performed in the order of cylinder #3→cylinder #4→cylinder #5→cylinder #6→cylinder #1→cylinder #2. Second-round fuel injection during ignition cut-off is performed in the similar order.

Then, in step ST8, whether or not fuel injection in the first-injection cylinder (for example, cylinder #3) is third-round fuel injection is determined. If the result of determination is YES, it is determined that the fuel in the requested injection amount for each cylinder (fuel injection twice) has been supplied to the first-injection cylinder (for example, cylinder #3), and ignition (first cycle) is started from the first-injection cylinder (step ST9). This routine thus ends.

According to control of start at the extremely low temperature in the present embodiment, the requested injection amount of fuel necessary during ignition cut-off at the time of start at the extremely low temperature is calculated and the injection start timing and the injection end timing are restricted to timings between which plug wetting is less likely. In addition, the number of times of ignition cut-off is calculated based on the injection start timing and the injection end timing and the requested injection amount. Therefore, wetting of spark plug 3 by fuel at the time of start at the extremely low temperature can be avoided even in an in-cylinder direct-injection engine in which combustion is unsatisfactory due to a shape of the combustion chamber or the like or an in-cylinder direct-injection engine in which friction is large. Successful first cycle can thus be ensured at the time of start at the extremely low temperature and starting capability is improved.

Moreover, the first-injection cylinder (for example, cylinder #3) is determined during ignition cut-off and ignition is started when third-round fuel injection is performed after the fuel in the requested injection amount for each cylinder is supplied to the first-injection cylinder. Therefore, fuel supply in an amount greater than the requested injection amount to the first-injection cylinder is avoided. Further, in third-round fuel injection, ignition is performed also in cylinders (for example, cylinder #4, cylinder #5, cylinder #6, cylinder #1, cylinder #2) where fuel is injected subsequent to the first-injection cylinder (for example, cylinder #3). Therefore, fuel supply in an amount greater than the requested injection amount is avoided also in these cylinders. By thus controlling the supply and injection amount for each cylinder during ignition cut-off, the fuel in each cylinder #1 to #6 does not become richer with respect to the requested injection amount, and smoldering of spark plug 3 after ignition can be avoided.

Here, if the engine is restarted at the extremely low temperature after the engine is stopped during ignition cut-off at the time of start at the extremely low temperature, the following problem arises.

For example, if ignition cut-off is started from cylinder #3 and engine 1 is stopped (cranking stop) at the time point when ninth ignition cut-off out of 12-times ignition cut-off ends (that is, the time point when second-round fuel injection in cylinder #5 ends), crankshaft 15 rotates through inertia and the crank position is displaced, in which case, fuel injection in cylinder #6 where second-round fuel injection should be performed may not be performed. If remaining ignition cut-off, that is, three-times ignition cut-off, is performed in such a state at next restart, fuel injection is performed three times starting from cylinder #1, skipping cylinder #6, which means that fuel injection in cylinder #3 is performed three times. Then, the fuel in cylinder #3 becomes over-rich, plug wetting takes place, and start may fail.

In this regard, according to control for start at the extremely low temperature in this embodiment, as described above, ignition is started without fail when third-round fuel injection in cylinder #3 is performed after the fuel in the requested injection amount for each cylinder is supplied (fuel injection twice) to cylinder #3 which is the first-injection cylinder. Therefore, even if the crank position is displaced as described above, the fuel in cylinder #3 which is the first-injection cylinder does not become over-rich and excellent start capability can be obtained.

Another Embodiment of Control of Start at Extremely Low Temperature

Figure 4:
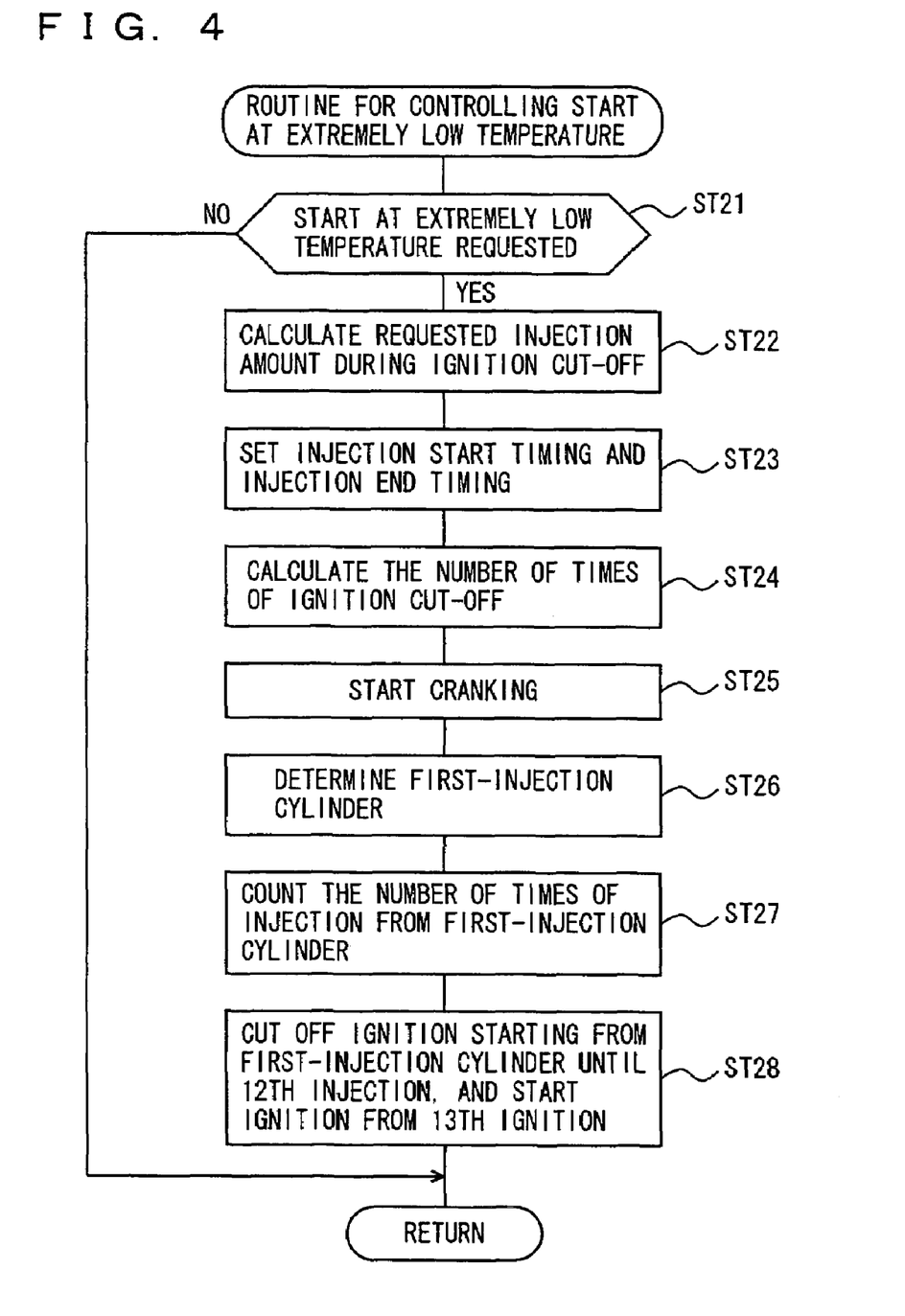
FIG. 4 is a flowchart showing another example of processing for controlling start at an extremely low temperature executed by the ECU.

Another example for processing for controlling start at the extremely low temperature executed by ECU 100 will be described with reference to the flowchart shown in FIG. 4. The present embodiment is also directed to an engine low in generated torque at the time of start, such as an in-cylinder direct-injection engine in which combustion is unsatisfactory due to a shape of the combustion chamber or the like or an in-cylinder direct-injection engine in which friction is large. It is noted that each processing in step ST21 to step ST25 in the flowchart in FIG. 4 is the same as that in step ST1 to step ST5 in FIG. 3 and detailed description thereof will not be provided.

In the present embodiment, when a request for start at the extremely low temperature is made, the number of times of ignition cut-off (12 times) is calculated in step ST24 and cranking is started in step ST25. Thereafter, the first-injection cylinder in which the fuel was injected first (for example, cylinder #3) is determined based on outputs from crank position sensor 35 and cam position sensor 36 (step ST26).

Then, counting of the number of times of injection from the first-injection cylinder is started (step ST27). Ignition is cut off until the injection count attains to 12, and ignition is started from 13th injection (for example, ignition (first cycle) of cylinder #3 which is the first-injection cylinder) (step ST28). This routine thus ends.

As described above, start of ignition after ignition cut-off can be controlled also by using the number of times of ignition cut-off in all cylinders, instead of controlling the number of times of ignition cut-off for each cylinder (amount of supply and injection).

According to control of start at the extremely low temperature in the present embodiment as well, the requested injection amount of fuel necessary during ignition cut-off at the time of start at the extremely low temperature is calculated and the injection start timing and the injection end timing are restricted to timings between which plug wetting is less likely. In addition, the number of times of ignition cut-off is calculated based on the injection start timing and the injection end timing and the requested injection amount. Therefore, wetting of spark plug 3 by fuel at the time of start at the extremely low temperature can be avoided even in an in-cylinder direct-injection engine in which combustion is unsatisfactory due to a shape of the combustion chamber or the like or an in-cylinder direct-injection engine in which friction is large. Successful first cycle can thus be ensured at the time of start at the extremely low temperature and starting capability is improved.

In the embodiment above, the present invention has been applied to an in-cylinder direct-injection engine in which combustion is unsatisfactory due to a shape of the combustion chamber or the like or an in-cylinder direct-injection engine in which friction is large. The present invention, however, is not limited as such, and it is also applicable to other in-cylinder direct-injection engines in which, in spite of its excellent start torque, plug wetting during ignition cut-off is likely at the time of start at the extremely low temperature.

In the embodiment above, the present invention has been applied to an in-cylinder direct-injection six-cylinder gasoline engine, however, the present invention is not limited as such, and it is also applicable to other in-cylinder direct-injection gasoline engines having any number of cylinders, such as an in-cylinder direct-injection four-cylinder gasoline engine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an in-cylinder direct-injection internal combustion engine applied to an in-cylinder direct-injection internal combustion engine, in which fuel is directly injected into a combustion chamber of each cylinder from a fuel injection valve and an air-fuel mixture formed by fuel injection is ignited by a spark plug and burnt, and controlling ignition cut-off for suspending ignition by said spark plug when said internal combustion engine is started at an extremely low temperature, comprising:
   an injection amount calculating unit calculating a requested injection amount of fuel necessary during ignition cut-off based on a temperature of engine coolant, when said internal combustion engine is started at the extremely low temperature;
   an injection timing setting unit setting injection start timing and injection end timing between which wetting of said spark plug by fuel is less likely;
   an ignition cut-off times calculating unit calculating number of times of ignition cut-off based on the set injection start timing and injection end timing and a calculated value of said requested injection amount; and
   a start control unit carrying out ignition cut-off at the time of start at the extremely low temperature based on a calculated value of the number of times of ignition cut-off.

2. The control device of an in-cylinder direct-injection internal combustion engine according to claim 1, wherein
   said start control unit determines a first-injection cylinder in which fuel was injected first during said ignition cut-off, and starts ignition when next fuel injection is performed in the first-injection cylinder after the fuel in the requested injection amount for each cylinder is supplied to the first-injection cylinder.

3. The control device of an in-cylinder direct-injection internal combustion engine according to claim 2, wherein
   said injection start timing and injection end timing between which wetting of said spark plug by fuel is less likely are timings except for timing around top dead center of the internal combustion engine.

4. The control device of an in-cylinder direct-injection internal combustion engine according to claim 1, wherein
   said start control unit determines a first-injection cylinder in which fuel was injected first during said ignition cut-off, and starts ignition when next fuel injection is performed after end of fuel injection as many times as the calculated value of the number of times of ignition cut-off for all cylinders counting from fuel injection in the first-injection cylinder.

5. The control device of an in-cylinder direct-injection internal combustion engine according to claim 4, wherein
   said injection start timing and injection end timing between which wetting of said spark plug by fuel is less likely are timings except for timing around top dead center of the internal combustion engine.

6. The control device of an in-cylinder direct-injection internal combustion engine according to claim 1, wherein
   said injection start timing and injection end timing between which wetting of said spark plug by fuel is less likely are timings except for timing around top dead center of the internal combustion engine.

7. A control device of an in-cylinder direct-injection internal combustion engine applied to an in-cylinder direct-injection internal combustion engine, in which fuel is directly injected into a combustion chamber of each cylinder from a fuel injection valve and an air-fuel mixture formed by fuel injection is ignited by a spark plug and burnt, and controlling ignition cut-off for suspending ignition by said spark plug when said internal combustion engine is started at an extremely low temperature, comprising:
   injection amount calculating means for calculating a requested injection amount of fuel necessary during ignition cut-off based on a temperature of engine coolant, when said internal combustion engine is started at the extremely low temperature;
   injection timing setting means for setting injection start timing and injection end timing between which wetting of said spark plug by fuel is less likely;
   ignition cut-off times calculating means for calculating number of times of ignition cut-off based on the set injection start timing and injection end timing and a calculated value of said requested injection amount; and
   start control means for carrying out ignition cut-off at the time of start at the extremely low temperature based on a calculated value of the number of times of ignition cut-off.

8. The control device of an in-cylinder direct-injection internal combustion engine according to claim 7, wherein
   said start control means includes means for determining a first-injection cylinder in which fuel was injected first during said ignition cut-off, and starting ignition when next fuel injection is performed in the first-injection cylinder after the fuel in the requested injection amount for each cylinder is supplied to the first-injection cylinder.

9. The control device of an in-cylinder direct-injection internal combustion engine according to claim 8, wherein said injection start timing and injection end timing between which wetting of said spark plug by fuel is less likely are timings except for timing around top dead center of the internal combustion engine.

10. The control device of an in-cylinder direct-injection internal combustion engine according to claim 7, wherein
said start control means includes means for determining a first-injection cylinder in which fuel was injected first during said ignition cut-off, and starting ignition when next fuel injection is performed after end of fuel injection as many times as the calculated value of the number of times of ignition cut-off for all cylinders counting from fuel injection in the first-injection cylinder.

11. The control device of an in-cylinder direct-injection internal combustion engine according to claim 10, wherein
said injection start timing and injection end timing between which wetting of said spark plug by fuel is less likely are timings except for timing around top dead center of the internal combustion engine.

12. The control device of an in-cylinder direct-injection internal combustion engine according to claim 7, wherein
said injection start timing and injection end timing between which wetting of said spark plug by fuel is less likely are timings except for timing around top dead center of the internal combustion engine.

* * * * *